(12) United States Patent
Pfaffinger, Jr. et al.

(10) Patent No.: US 9,615,007 B2
(45) Date of Patent: Apr. 4, 2017

(54) OVEN CAMERA ASSEMBLY

(71) Applicant: General Electric Company, Schenectady, NY (US)

(72) Inventors: Robert Charles Pfaffinger, Jr., Louisville, KY (US); Michael A. Funk, Louisville, KY (US); Rebekah Leigh Tyler, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 0 days.

(21) Appl. No.: 14/737,826

(22) Filed: Jun. 12, 2015

(65) Prior Publication Data

US 2016/0366314 A1 Dec. 15, 2016

(51) Int. Cl.
*H04N 5/225* (2006.01)
*F24C 15/04* (2006.01)
*F27B 5/18* (2006.01)
*F24C 7/08* (2006.01)

(52) U.S. Cl.
CPC .............. *H04N 5/2253* (2013.01); *F24C 7/08* (2013.01); *F24C 15/04* (2013.01); *F27B 5/18* (2013.01); *H04N 5/2252* (2013.01)

(58) Field of Classification Search
CPC .......... G08B 13/1963; G08B 13/19632; G03B 17/56; F16M 11/28
See application file for complete search history.

(56) References Cited

U.S. PATENT DOCUMENTS

| | | | |
|---|---|---|---|
| 7,905,667 B2 * | 3/2011 | Barker | F16M 11/14 135/66 |
| 2005/0092877 A1 * | 5/2005 | Carnevali | F16M 11/40 248/160 |
| 2010/0253832 A1 * | 10/2010 | Duparre | H01L 27/14618 348/360 |
| 2011/0123689 A1 | 5/2011 | Luckhardt et al. | |
| 2011/0192951 A1 * | 8/2011 | Gooch | F16M 11/12 248/316.7 |
| 2014/0048055 A1 | 2/2014 | Ruther | |
| 2015/0241761 A1 * | 8/2015 | Llewellyn | G03B 17/56 396/448 |
| 2015/0285512 A1 * | 10/2015 | Matarazzi | F24C 15/00 99/341 |
| 2016/0044227 A1 * | 2/2016 | Johnson | G03B 17/561 348/211.2 |

FOREIGN PATENT DOCUMENTS

| | | |
|---|---|---|
| CN | 203263109 U | 6/2013 |
| EP | 2530387 A1 | 12/2012 |
| WO | WO 2014086487 A1 | 6/2014 |

* cited by examiner

Primary Examiner — James Hannett
(74) Attorney, Agent, or Firm — Dority & Manning, P.A.

(57) ABSTRACT

A camera assembly for an oven appliance including an attachment mechanism, an arm, and a camera is provided. The attachment mechanism is configured for attachment to a handle of an oven appliance door. The arm extends from the attachment mechanism to the camera, and attaches to at least one of the camera or a housing, if provided. The camera records or transmits images of the oven cavity to, e.g., a user device allowing a user to monitor a doneness of any food items positioned within the oven appliance.

18 Claims, 4 Drawing Sheets

OVEN CAMERA ASSEMBLY

FIELD OF THE INVENTION

The subject matter of the present disclosure relates generally to a camera for an oven appliance.

BACKGROUND OF THE INVENTION

Oven appliances generally include an insulated and heated oven cavity for baking food items therein. An opening to the oven cavity is covered by an insulated door movable between an open position and a closed position. Commonly, the door includes a transparent panel allowing a user to view the contents of the oven cavity, such as various food items, with the door in the closed position.

Cooking operations of certain food items requires a user to visibly inspect such food items to periodically determine a doneness of such food items. Accordingly, with conventional oven appliances, a user must physically look through the transparent panel of the door to periodically inspect such food items. More recently, however, certain oven appliances have included a camera within the oven cavity, wired to a peripheral screen positioned, e.g., on a control panel of the oven appliance. The camera can allow a user to inspect the doneness of food items within the oven cavity without looking through the transparent panel of the door. However, providing a camera capable of withstanding the relatively high temperatures within the oven cavity can be costly and relatively complex. Additionally, retrofitting a conventional oven appliance with such a camera may also be costly and relatively complex.

Accordingly, a camera assembly for an oven appliance that allows a user to view one or more food items within the oven cavity would be useful. More particularly, a camera assembly for an oven appliance that allows a user to view one or more food items within the oven cavity without requiring installation of a camera within the oven cavity would be particularly beneficial.

BRIEF DESCRIPTION OF THE INVENTION

Aspects and advantages of the invention will be set forth in part in the following description, may be apparent from the description, or may be learned through practice of the invention.

In a first exemplary embodiment a camera assembly for an oven appliance is provided. The oven appliance defines an oven cavity and includes a door with a handle positioned over an opening to the oven cavity. The camera assembly includes an attachment mechanism configured for attachment to the handle of the door of the oven appliance and an arm extending between a first end and a second end. The arm is attached to the attachment mechanism at the first end. The camera assembly also includes a housing having a camera at least partially positioned therein. The second end of the arm is attached to at least one of the housing or the camera. The housing is configured to hold the camera adjacent to an outside surface of the door of the oven appliance, and the camera is configured to record or transmit images of the oven cavity.

In a second exemplary embodiment an oven appliance is provided. The oven appliance includes a cabinet defining an oven cavity and an oven door positioned over an opening of the oven cavity. The oven door includes at least one transparent panel for viewing into the oven cavity. The oven appliance also includes a handle mounted on the oven door and a camera assembly attached to the handle. The camera assembly includes a housing having a camera positioned at least partially therein. The housing includes a lip contacting the at least one transparent panel and the camera is configured to record or transmit one or more images of the oven cavity.

In a third exemplary embodiment a camera assembly for an oven appliance is provided. The oven appliance defines an oven cavity and includes a door with a handle positioned over an opening to the oven cavity. The camera assembly includes an attachment mechanism configured for attachment to the handle of the door of the oven appliance and an arm extending between a first end and a second end. The arm is attached to the attachment mechanism at the first end. The camera assembly also includes a camera attached to the second end of the arm and configured to be positioned adjacent to an outside surface of the door of the oven appliance. The camera is configured to record or transmit images of the oven cavity.

These and other features, aspects, and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
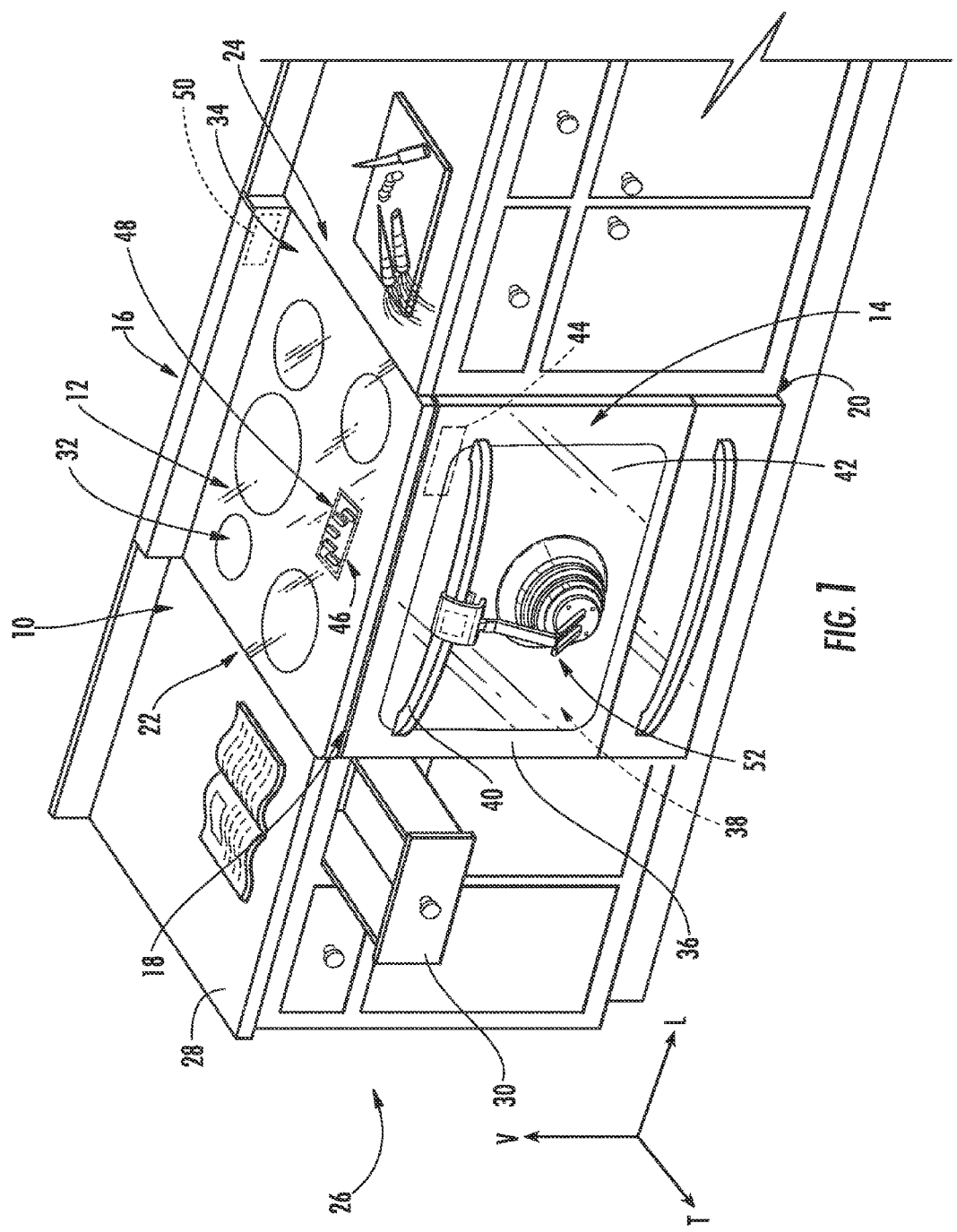
FIG. 1 provides a perspective view of an oven appliance received within a set of kitchen cabinets according to an exemplary embodiment of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 provides a perspective view of an oven appliance 10 including a cooktop 12 received within a set of kitchen cabinets. The oven appliance 10 extends between a front end 14 and a rear end 16 along a transverse direction T, between a top end 18 and a bottom end 20 along a vertical direction V, and between a left side 22 and a right side 24 along a lateral direction L. The kitchen cabinets depicted in FIG. 1 include a base set 26 of kitchen cabinets extending along the lateral direction L. Base set 26 of kitchen cabinets includes countertops 28 and drawers 30. Oven appliance 10 is received within base set 26 of kitchen cabinets. Although not depicted, kitchen cabinets may also include a top set of kitchen cabinets with a range or hood positioned over the oven appliance 10 along the vertical direction V.

Cooktop 12 of oven appliance 10 includes a plurality of stove heating elements (referred to generally as numeral 32), e.g., electrical resistive heating elements, gas burners, induction heating elements, and/or any other suitable heating element or combination of heating elements. More particularly, for the embodiment depicted, cooktop 12 of the oven appliance 10 includes five induction heating elements positioned on a top surface 34 of the cooktop 12. Cooking utensils may be placed on stove heating elements 32 to cook or heat food items.

Oven appliance 10 also includes a door 36 that permits access to an oven cavity 38 (shown in phantom) of the oven appliance 10, e.g., for cooking or baking of food items therein. The oven appliance 10 may include one or more oven heating elements (not shown), such as a bake heating element and a broil heating element, positioned in the oven cavity 38 for increasing the temperature within the oven cavity 38 during operation of the oven appliance 10. In certain exemplary embodiments, one or both of the oven heating elements may include an electrical resistance heating element or a gas burner heating element.

Additionally, for the embodiment depicted, the door 36 includes a handle 40 positioned at a top portion of the door 36 along the vertical direction V. The handle 40 may assist a user in moving the door 36 between an open position (not shown) and a closed position, as depicted. For example, the door 36 may be pivotable at a bottom portion to provide such movement. When the door 36 is in the open position, an opening to the oven cavity 38 may be exposed such that a user may add or remove one or more food items to or from the oven cavity 38. By contrast, when the door 36 is in the closed position, the door 36 covers the opening to the oven cavity 38 such that the oven cavity 38 is thermally insulated and may efficiently cook or bake the one or more food items positioned therein.

The exemplary door 36 depicted includes at least one transparent panel 42 to allow a user to view inside the oven cavity 38 during operation of the oven appliance 10 and, e.g., determine a doneness of any food items positioned therein. For example, in certain exemplary embodiments, the door 36 may include a plurality of transparent glass panes, such that the glass panes insulate the oven cavity 38 and allow for a reasonably safe temperature on an outside surface of such glass panes. Further, the exemplary oven appliance 10 depicted includes a door lock 44 that, when engaged, prevents door 36 from opening. Door lock 44 may be an electromechanical lock or any other suitable locking device.

Oven appliance 10 additionally includes a user interface 46. For the embodiment depicted, the user interface 46 is positioned at a middle portion of the oven appliance 10 along the lateral direction L (i.e., between left side 22 and right side 24) and proximate front end 14 of the oven appliance 10 along the transverse direction T. Additionally, the user interface 46 defines a top surface 48 that is flush with the top surface 34 of the oven appliance 10. However, in other exemplary embodiments, the user interface 46 may have any other suitable position or configuration.

The operation of the oven appliance 10, including the oven heating elements and stove heating elements 32, is controlled by a processing device such as a controller 50 (shown in phantom), which may include a microprocessor or other device that is in operable communication with such components. For example, in the embodiment depicted, controller 50 is operatively coupled or in communication with the stove heating elements 32, the user interface 46, and the oven heating elements. Additionally, the controller 50 may be operatively coupled with various other components of the oven appliance 10, such as, e.g., the door lock 44. In response to user manipulation of the user interface 46, the controller 50 may operate the oven appliance 10 to execute selected cycles and features.

Controller 50 may include a memory and microprocessor, such as a general or special purpose microprocessor operable to execute programming instructions or micro-control code. The memory may represent random access memory such as DRAM, and/or read only memory such as ROM or FLASH. In one embodiment, the processor executes programming instructions stored in memory. The memory may be a separate component from the processor or may be included onboard within the processor. The oven heating elements, stove heating elements 32, user interface 46, and other components of the oven appliance 10 may be in communication with controller 50 via one or more signal lines or shared communication busses.

It should be appreciated, however, that the oven appliance 10 described herein with reference to FIG. 1 is provided by way of example only and is not intended to limit the present subject matter in any aspect. Thus, the present subject matter may be used with other oven appliance 10 configurations, e.g., wall oven appliances, double-oven appliances, etc.

Figure 2:
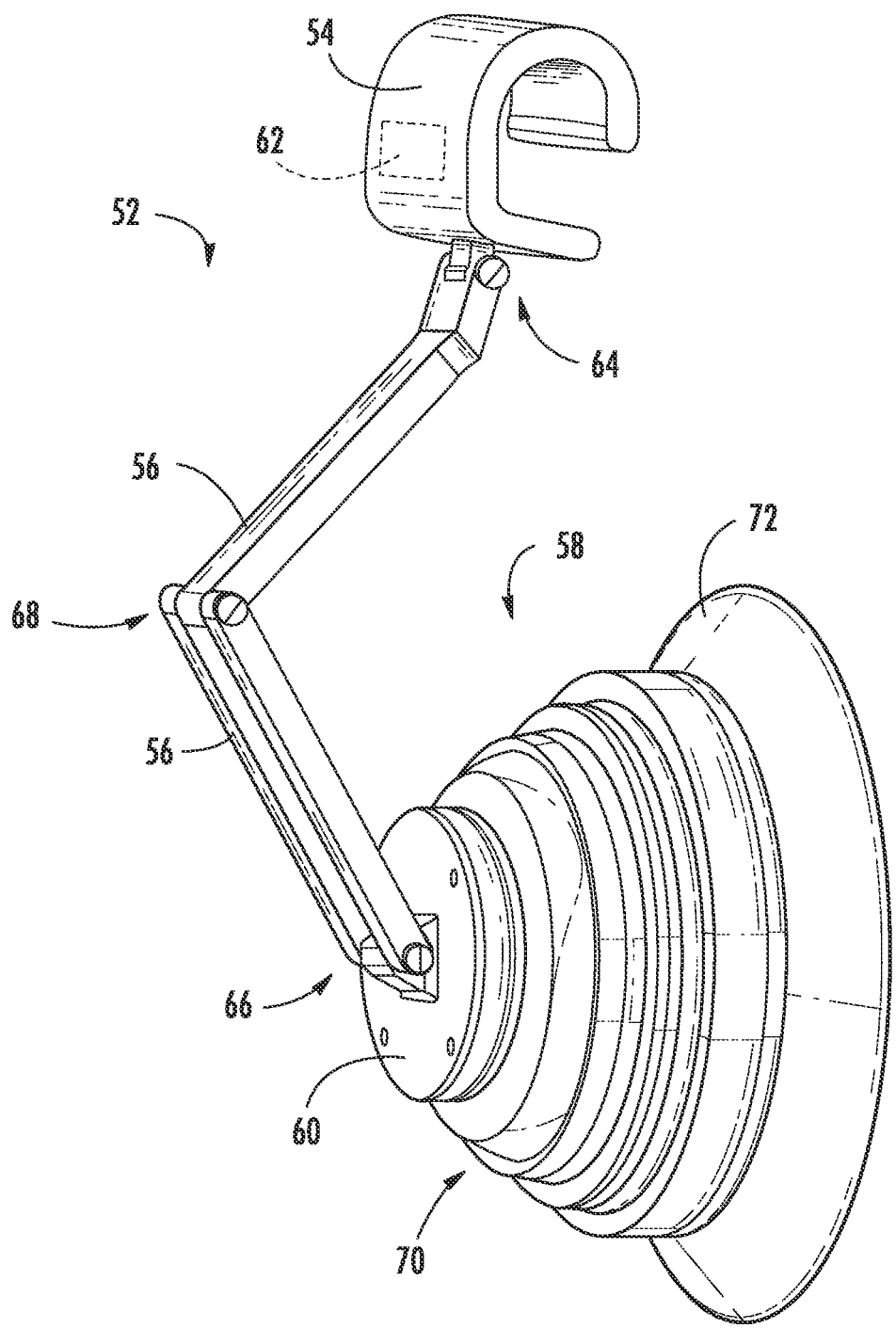
FIG. 2 provides a perspective view of a camera assembly in accordance with an exemplary embodiment of the present disclosure.

Referring still to FIG. 1, and now also to FIG. 2, the exemplary oven appliance 10 includes a camera assembly 52 in accordance with an exemplary embodiment of the present disclosure attached to the handle 40. FIG. 2 provides a close-up, perspective view of the exemplary camera assembly 52 depicted in FIG. 1.

The exemplary camera assembly 52 generally includes an attachment mechanism 54, an arm 56, a housing 58, and a camera 60. The attachment mechanism 54 is configured for attachment to the handle 40 of the door 36 of the oven appliance 10. More particularly, for the embodiment depicted, the attachment mechanism 54 is a clip for clipping onto the handle 40 of the door 36 of the oven appliance 10. In certain exemplary embodiments, the attachment mechanism 54 may be a generic size, capable of fitting over a variety of handles of a variety of oven appliances, or alternatively may be designed for a specific handle of a specific make/model oven appliance. In the former configuration, the camera assembly 52 may include a plurality of inserts such that the attachment mechanism 54 is customizable to a specific size of handle. Alternatively, the clip may be formed of a moldable or compressible material to conform to a specific handle of an oven appliance 10.

Notably, in certain configurations, the attachment mechanism 54 may include a battery 62 (shown in phantom) in electrical communication with the camera 60 (i.e., providing electrical power to the camera 60). For example, the attachment mechanism 54 may include the battery 62 positioned within a battery compartment with one or more electrical wires running through the arm 56 of the camera assembly 52. The battery 62 may accordingly be used to power the camera 60 during operation of the camera assembly 52.

The arm 56 extends generally between a first end 64 and a second end 66. The arm 56 is attached to the attachment mechanism 54 at the first end 64 and to at least one of the housing 58 or the camera 60 at the second end 66. More specifically, for the embodiment depicted, the second end 66 of the arm 56 is attached to the camera 60 of the camera assembly 52 at the second end 66. It should be understood, however, that in other exemplary embodiments, the second end 66 of the arm 56 may additionally or alternatively be attached to the housing 58 at any suitable location on the housing 58.

Referring still to FIGS. 1 and 2, for the embodiment depicted, the arm 56 is pivotally attached at the first end 64 to the attachment mechanism 54 and is similarly pivotally attached at the second end 66 to the camera 60. The arm 56 further includes a pivot point 68 between the first end 64 and the second end 66 such that the arm 56 is adjustable to a variety of different effective lengths between the first end 64 and the second end 66. Such a configuration may allow a user of the camera assembly 52 to adjust a position of the camera 60 of the camera assembly 52 to a variety of different locations along the vertical direction V relative to the handle 40 of the door 36. Accordingly, with such a configuration, the user of the camera assembly 52 may position the camera 60 to view one or more food items positioned at a variety of different elevations along the vertical direction V within the oven cavity 38.

Figure 3:
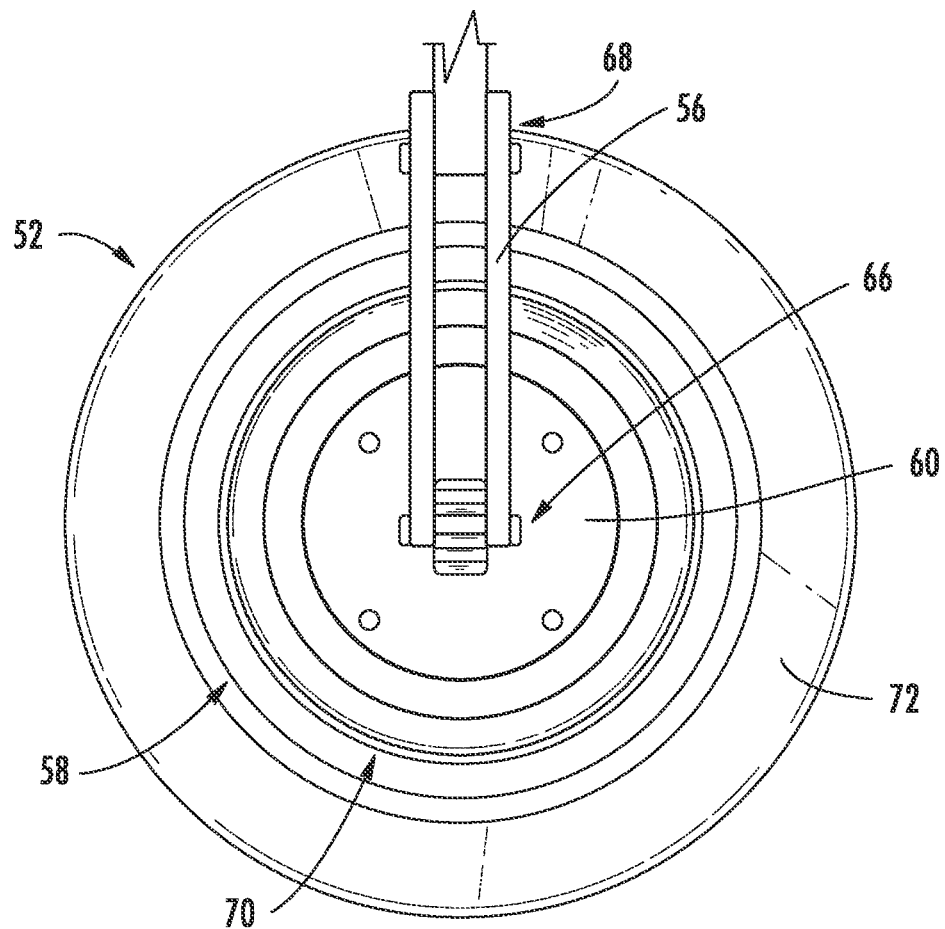
FIG. 3 provides a top view of the exemplary camera assembly of FIG. 2.

Referring now also to FIG. 3, a top view of the housing 58 and camera 60 is provided. As shown, the housing 58 generally includes an attachment portion 70 and a lip 72. For the embodiment depicted, the lip 72 is a circular lip formed of an elastomeric material, such as rubber. For example, the lip 72 may be configured essentially as a suction cup configured to be pressed against an outside surface 74 of the one or more transparent panels 42 of the door 36 (see FIGS. 4 and 5, discussed below). Moreover, the lip 72 of the housing 58 has a greater diameter than the attachment portion 70 of the housing 58. When the camera assembly 52 is connected to the oven appliance 10, or more particularly when the attachment mechanism 54 is attached to the handle 40 of the door 36 of the oven appliance 10, the lip 72 may contact the outer surface 74 of the one or more transparent panels 42 of the door 36 and block an amount of ambient light from reaching the camera 60. Notably, such a configuration may be especially effective when, for example, the one or more transparent panels 42 includes a double-pane glass, wherein ambient light may otherwise be reflected off an outside surface of the outer pane and an outer surface of an inner pane.

Figure 4:
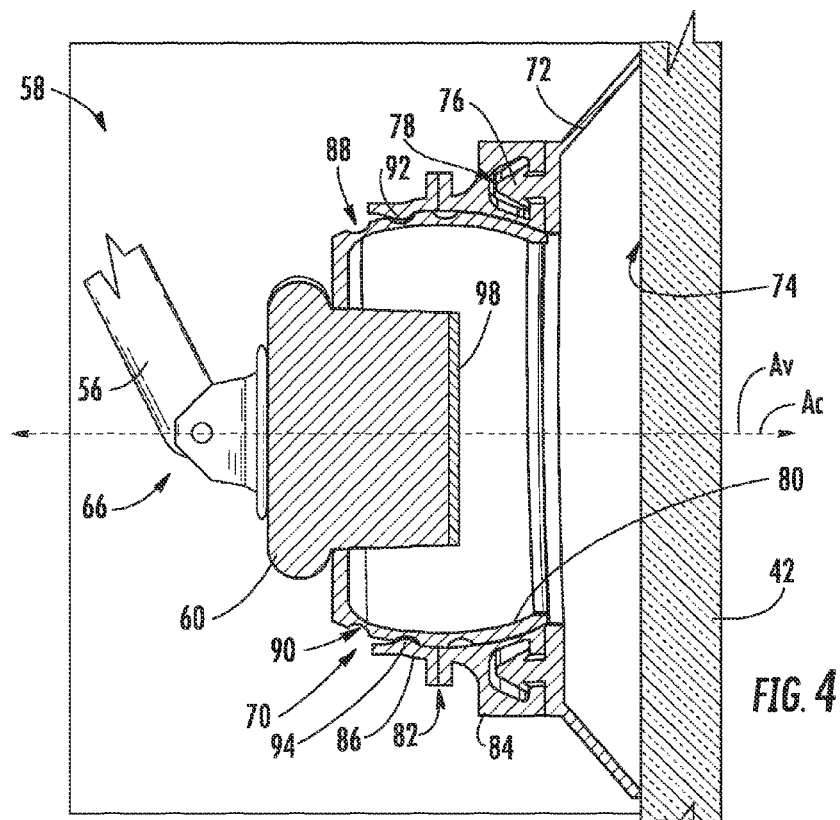
FIG. 4 provides a side, cross-sectional view of the exemplary camera assembly of FIG. 2 in a first position.
Figure 5:
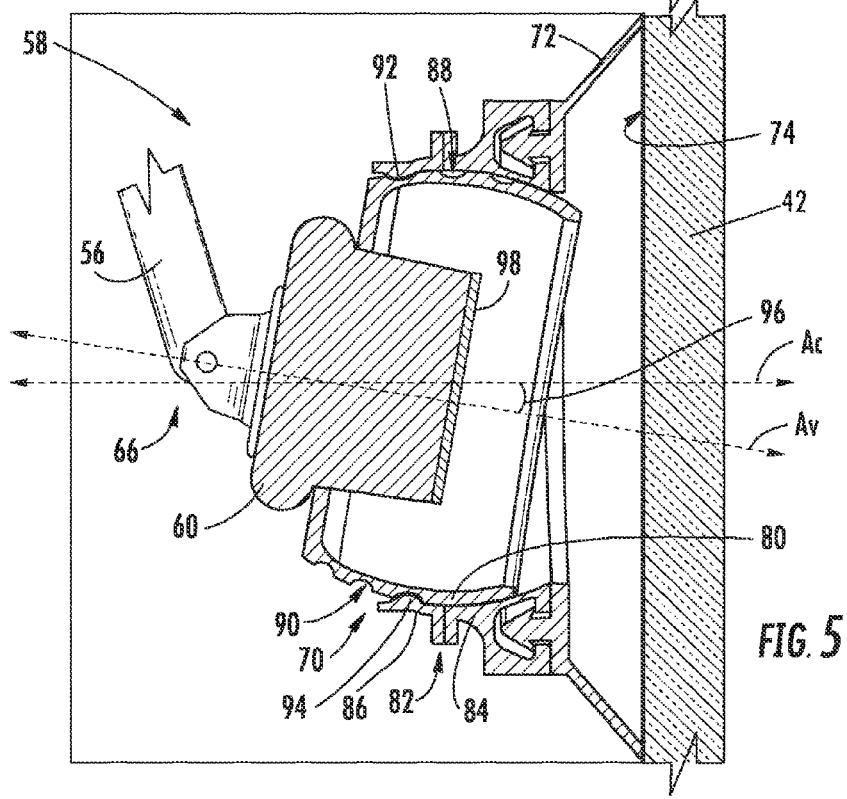
FIG. 5 provides a side, cross-sectional view of the exemplary camera assembly of FIG. 2 in a second position.

Reference will now be made to FIGS. 4 and 5. FIG. 4 provides a side cross-sectional view of the housing 58 and camera 60 of the exemplary camera assembly 52 in a first position, and FIG. 5 provides a side, cross-sectional view of the housing 58 and camera 60 of the exemplary camera assembly 52 in a second position As previously stated, the housing 58 of the camera assembly 52 generally includes the attachment portion 70 and the lip 72. The lip 72 includes a plurality of hooks 76 that are received within a plurality of openings 78 defined in the attachment portion 70 of the housing 58. For the embodiment depicted, the attachment portion 70 includes a ball 80 and a socket 82, with the camera 60 attached to, and positioned at least partially within, the ball 80. The ball 80 is at least partially positioned within the socket 82 and is movable relative to the socket 82, such that an angle of the camera 60 may be adjusted by moving the ball 80 relative to the socket 82. The socket 82 is formed, for the embodiment depicted, of an inner casing 84 and an outer casing 86, joined in any suitable manner around the ball 80. For example, the inner and outer casings 84, 86 may be joined by ultrasonic welding or by using one or more bolts, screws, or other mechanical fasteners. It should be appreciated, however, that in other exemplary embodiments, the socket 82 may be formed in any other suitable manner.

Notably, the exemplary attachment portion 70 depicted is configured with a plurality of preset adjustment settings to allow for easy adjustment of the ball 80 and camera 60. More particularly, the exemplary ball 80 depicted includes three upper indents 88 and three lower indents 90. The socket 82 includes an upper projection 92 and a lower projection 94, the upper projection 92 of the socket 82 configured to fit within one of the three upper indents 88 of the ball 80, and the lower projection 94 of the socket 82 is configured to fit within one of the three lower indents 90 of the ball 80. Each of the upper indents 88 of the ball 80 and lower indents 92 of the ball 80 corresponds to different positions of the ball 80 and camera 60 relative to the socket 82.

Referring still to FIGS. 4 and 5, for the embodiment depicted, the socket 82 of the attachment portion 70 of the housing 58 defines a central axis $A_C$. Additionally, the ball 80 of the attachment portion 70 of the housing 58 and the camera 60 define a viewing axis $A_V$. Despite a relative position of the viewing axis $A_V$ to the central axis $A_C$, the central axis $A_C$ remains substantially perpendicular to a plane defined by the outer surface 74 of the one or more transparent panels 42 of the door 36. For the embodiment depicted, the viewing axis $A_V$ defines an angle 96 with the central axis $A_C$ between about zero degrees (see FIG. 4) and up to about plus or minus ten degrees (see FIG. 5, depicting the angle 96 at minus about ten degrees). Accordingly, for the exemplary embodiment depicted, the camera 60 defines a range of motion of approximately twenty degrees relative to the socket 82 of the attachment portion 70 of the housing 58.

It should be appreciated, however, that in other exemplary embodiments, the viewing axis $A_V$ may instead define any other suitable angle 96 with the central axis $A_C$. For example, in other exemplary embodiments, the viewing axis $A_V$ may define an angle 96 with the central axis $A_C$ between about zero degrees and plus or minus about fifteen degrees, plus or minus about twenty degrees, or plus or minus about thirty degrees. Accordingly, in other exemplary embodiments, the camera 60 may instead define a range of motion of approximately thirty degrees, approximately forty degrees, or approximately sixty degrees, respectively. It should also be appreciated, that as used herein, terms of approximation, such as "about" and "approximately," refer to being within a ten percent margin of error.

Moreover, it should be appreciated that in still other exemplary embodiments, the camera assembly 52 may not include a housing 58, or alternatively, may include any other suitable housing 58. For example, in other exemplary embodiments, the attachment portion 70 of the housing 58 may be fixed such that the camera 60 does not define a range of motion, and additionally, or alternatively, the housing 58 may only include a lip 72 attached directly to the camera 60.

As previously stated, and as is depicted in FIGS. 4 and 5, the camera 60 is attached to the ball 80 of the attachment portion 70 of the housing 58. The camera 60 is configured to record or transmit one or more images of the oven cavity 38. More particularly, the camera 60 is configured to record or transmit one or more images of the oven cavity 38, through the one or more transparent panels 42 of the door 36 of the oven appliance 10. In addition to the lip 72, which is configured to block a portion of the ambient light from reaching the camera 60, the camera 60 includes a lens 98 the may reduce a distortion of the images of the oven cavity 38. More particularly, in certain exemplary embodiments, the lens 98 may include a glare-resistant coating. The glare resistant coating on the lens 98 may include any suitable coating for reducing image distortions associated with reflections off a surface of the one or more transparent panels 42 of the door 36 of the oven appliance 10.

In certain exemplary embodiments, the camera 60 may be connected through one or more wires to a peripheral display device, such as a computer screen. Alternatively, for the exemplary embodiment depicted, the camera 60 is configured to transmit the one or more images of the oven cavity 38 wirelessly to one or more user devices. Accordingly, the camera 60 may include one or more processors, memory, and a wireless transmitter/receiver configured for wireless communication to a user device. For example, the camera 60 may be configured for wireless communication using a wireless local area network (such as an intranet), wide area network (such as the Internet), wireless sensor networks (such as Bluetooth), point-to point communication networks (such as radio frequency identification networks, near field communications networks, etc.), or a combination of two or more of the above networks. Additionally, in certain exemplary embodiments, the user device may include a computer, smartphone, tablet, or other device capable of receiving wireless communications or transmissions over a wireless network. As used herein, wireless communication or transmission refers to transferring information between two or more components that are not connected by any electrical conductors, such as wires. In certain exemplary embodiments, the one or more images may be configured as a video feed of the oven cavity 38, or alternatively, the one or more images may be configured as still shots of the oven cavity 38.

A camera assembly 52 in accordance with one or more of the exemplary embodiments described herein may assist a user in monitoring a doneness of one or more food items positioned within an oven cavity of an oven appliance without having to physically monitor such food items through a transparent panel of an oven door. Additionally, a camera assembly in accordance with one or more of the exemplary embodiments described herein may allow a user to monitor a doneness of one or more food items positioned within an oven cavity of an oven appliance without having to, e.g., bend over and peer through a transparent panel of an oven door.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. A camera assembly for an oven appliance, the oven appliance defining an oven cavity and including a door with a handle positioned over an opening to the oven cavity, the camera assembly comprising:
   an attachment mechanism configured for attachment to the handle of the door of the oven appliance;
   an arm extending between a first end and a second end, the arm attached to the attachment mechanism at the first end; and
   a housing having a camera at least partially positioned therein, the second end of the arm attached to at least one of the housing or the camera, the housing configured to hold the camera adjacent to an outside surface of the door of the oven appliance, and the camera configured to record or transmit images of the oven cavity;
   wherein the housing includes an attachment portion, wherein the attachment portion includes a socket and a ball movably positioned at least partially within the socket, and wherein the camera is attached to the ball and positioned at least partially within the ball.

2. The camera assembly of claim 1, wherein the attachment mechanism is a clip for clipping onto the handle of the door of the oven appliance.

3. The camera assembly of claim 1, wherein the housing includes an attachment portion and a lip, wherein the lip is positioned adjacent to the attachment portion and defines a frustoconical shape for blocking ambient light from reaching the camera.

4. The camera assembly of claim 3, wherein the lip is a circular lip formed of an elastomeric material.

5. The camera assembly of claim 1, wherein the socket defines central axis, wherein the ball of the attachment portion and the camera define a viewing axis, and wherein the viewing axis defines an angle with the central axis between about zero degrees and about ten degrees.

6. The camera assembly of claim 1, wherein the second end of the arm is attached to the camera.

7. The camera assembly of claim 1, wherein the arm is pivotally attached to the attachment mechanism, wherein the arm is pivotally attached to at least one of the housing or the camera, and wherein the arm further includes a pivot point between the first end and second end.

8. The camera assembly of claim 1, wherein the attachment mechanism includes a battery, and wherein the battery is in electrical communication with the camera.

9. The camera assembly of claim 1, wherein the camera includes a lens, and wherein the lens includes a glare-resistant coating.

10. The camera assembly of claim 1, wherein the camera is configured to transmit images of the oven cavity wirelessly to one or more user devices.

11. An oven appliance comprising:
    a cabinet defining an oven cavity;
    an oven door positioned over an opening of the oven cavity, the oven door including at least one transparent panel for viewing into the oven cavity;
    a handle mounted on the oven door; and
    a camera assembly attached to the handle and including a housing having a camera positioned at least partially therein, the housing including a lip contacting the at least one transparent panel and the camera configured to record or transmit one or more images of the oven cavity;
    wherein the housing further includes an attachment portion, wherein the lip is positioned adjacent to the attachment portion and defines a frustoconical shape for blocking ambient light from reaching the camera, wherein the attachment portion includes a socket and a ball movably positioned at least partially within the socket, and wherein the camera is attached to the ball and positioned at least partially within the ball.

12. The oven appliance of claim 11, wherein the socket defines central axis, wherein the ball of the attachment portion and the camera define a viewing axis, and wherein the viewing axis defines an angle with the central axis between about zero degrees and about ten degrees.

13. The oven appliance of claim 11, wherein the lip has a greater diameter than the attachment portion.

14. The oven appliance of claim 11, wherein the camera assembly further includes an attachment mechanism and an arm, the attachment mechanism attached to the handle and the arm extending from the attachment mechanism and attached to at least one of the housing or the camera.

15. The oven appliance of claim 14, wherein the arm is pivotally attached to the attachment mechanism, wherein the arm is pivotally attached to at least one of the housing or the camera, and wherein the arm further includes a pivot point between the first end and second end.

16. The oven appliance of claim 14, wherein the attachment mechanism includes a battery, and wherein the battery is in electrical communication with the camera.

17. The oven appliance of claim 11, wherein the camera includes a lens, and wherein the lens includes a glare-resistant coating.

18. The camera assembly of claim 1, wherein the housing includes an attachment portion and a lip, wherein the lip is attached directly to the attachment portion of the housing for blocking ambient light from reaching the camera.

* * * * *